(12) United States Patent
Ikeno

(10) Patent No.: US 10,036,932 B2
(45) Date of Patent: Jul. 31, 2018

(54) DISPLAY ELEMENT, BACKLIGHT AND PORTABLE INFORMATION DEVICE USING THE DISPLAY ELEMENT

(71) Applicant: NLT Technologies, Ltd., Kanagawa (JP)

(72) Inventor: Hidenori Ikeno, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 123 days.

(21) Appl. No.: 14/879,230

(22) Filed: Oct. 9, 2015

(65) Prior Publication Data
US 2016/0103381 A1    Apr. 14, 2016

(30) Foreign Application Priority Data

Oct. 11, 2014   (JP) ................................. 2014-209533

(51) Int. Cl.
*G02F 1/19*   (2006.01)
*G02F 1/1335*   (2006.01)
(Continued)

(52) U.S. Cl.
CPC .......... *G02F 1/19* (2013.01); *G02F 1/133553* (2013.01); *G06F 1/1647* (2013.01);
(Continued)

(58) Field of Classification Search
CPC ................................. G02F 1/19; G09G 3/3406
See application file for complete search history.

(56) References Cited

U.S. PATENT DOCUMENTS

| | | | |
|---|---|---|---|
| 5,635,729 A | 6/1997 | Griessen et al. | |
| 2004/0017529 A1* | 1/2004 | Choi | G02B 5/3083 |
| | | | 349/114 |

(Continued)

FOREIGN PATENT DOCUMENTS

| | | |
|---|---|---|
| JP | 2003-035893 | 2/2003 |
| JP | 2004-258400 | 9/2004 |

(Continued)

OTHER PUBLICATIONS

Kazuki Yoshimura, "Development of switchable mirror glass with high energy efficiency", Applied Physics, vol. 79, pp. 628-632, 2010.

(Continued)

*Primary Examiner* — Sang V Nguyen
(74) *Attorney, Agent, or Firm* — Young & Thompson

(57) ABSTRACT

Provided is to a display element capable of displaying an image on both sides thereof. In the display element, display operation is not constantly performed on both sides, and the display operation is, as necessary, switched to displaying only on one side without lowering the efficiency of a backlight or other light emitting bodies. The structure is made such that a planar light emitting body capable of emitting light in directions of both faces is sandwiched between two light control elements capable of electrically switching, from outside, between a light reflection state and a light transmission state. In such a structure, the faces of the light control elements serving as light reflection surfaces in the light reflection state face the planar light emitting body, and the planar light emitting body and the light control elements are further sandwiched between two liquid crystal elements.

7 Claims, 9 Drawing Sheets

(51) Int. Cl.
  *G06F 1/16* (2006.01)
  *G09G 3/34* (2006.01)
  *G09G 3/36* (2006.01)
  *G02F 1/1333* (2006.01)

(52) U.S. Cl.
  CPC ......... *G09G 3/3406* (2013.01); *G09G 3/3473* (2013.01); *G02F 2001/133342* (2013.01); *G09G 3/36* (2013.01); *G09G 2300/023* (2013.01); *G09G 2300/0469* (2013.01); *G09G 2300/0495* (2013.01)

(56) References Cited

U.S. PATENT DOCUMENTS

| | | | | |
|---|---|---|---|---|
| 2004/0100423 | A1* | 5/2004 | Nagakubo | G02B 6/0055 345/40 |
| 2004/0125430 | A1* | 7/2004 | Kasajima | G02F 1/133536 359/247 |
| 2004/0136155 | A1* | 7/2004 | Onishi | G02F 1/133615 361/679.24 |
| 2005/0168422 | A1* | 8/2005 | Oh | G02F 1/133308 345/87 |
| 2006/0203154 | A1 | 9/2006 | Uchida | |
| 2006/0209002 | A1* | 9/2006 | Uchikawa | G02F 1/1336 345/102 |
| 2006/0274549 | A1 | 12/2006 | Fukuyoshi | |
| 2007/0002226 | A1* | 1/2007 | Sakamoto | G02F 1/133555 349/114 |
| 2008/0094700 | A1* | 4/2008 | Uehara | G02B 3/0025 359/463 |
| 2008/0237005 | A1* | 10/2008 | Honda | G02F 1/1368 200/181 |
| 2010/0309541 | A1* | 12/2010 | Lo | G02B 26/005 359/292 |
| 2011/0062434 | A1* | 3/2011 | Eguchi | H01L 27/12 257/43 |
| 2012/0169967 | A1* | 7/2012 | Han | G02F 1/1333 349/62 |
| 2012/0212523 | A1 | 8/2012 | Yamauchi | |
| 2015/0022564 | A1* | 1/2015 | Zhang | G02F 1/1347 345/690 |
| 2015/0378391 | A1* | 12/2015 | Huitema | G06F 1/163 361/679.03 |

FOREIGN PATENT DOCUMENTS

| | | |
|---|---|---|
| JP | 2004-279669 | 10/2004 |
| JP | 4806215 | 11/2011 |
| JP | 2012-173449 | 9/2012 |

OTHER PUBLICATIONS

Kazuki Yoshimura, "Foundation and Application of Smart Window and switchable mirror", Electronic Journal No. 1376, Technical Seminar document, 2012.

J.N. Huiberts, et al., "Yttrium and lanthanum hydride films with switchable optical properties", Nature, vol. 380, pp. 231-234, 1996.

* cited by examiner

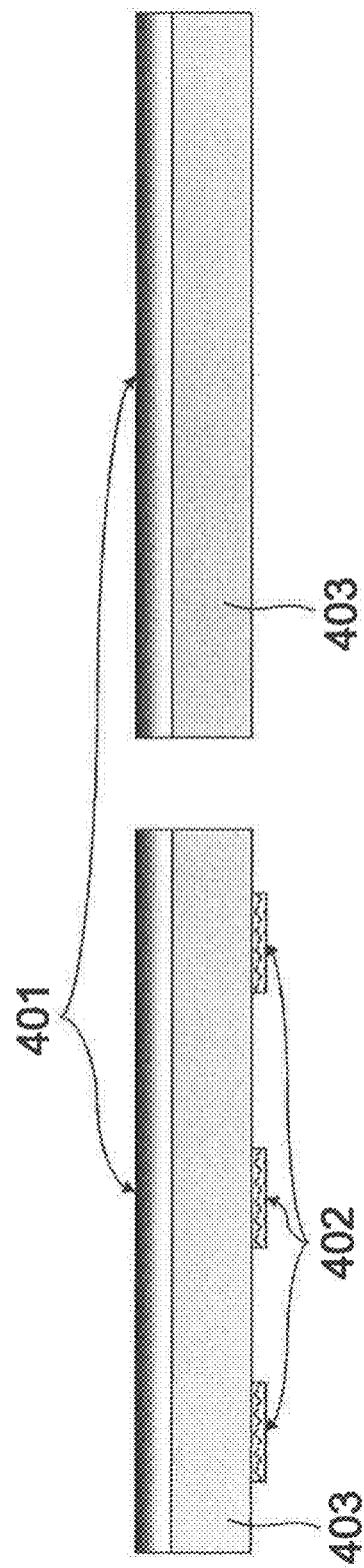
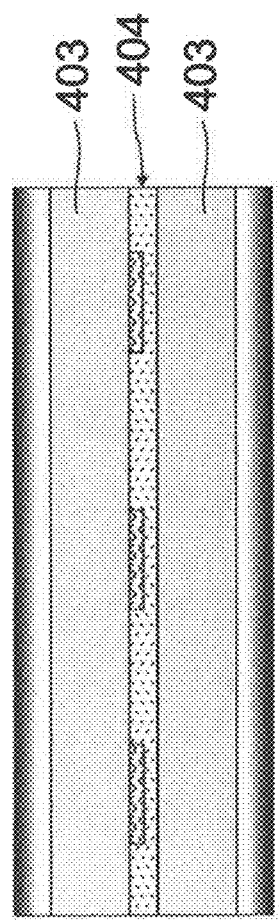

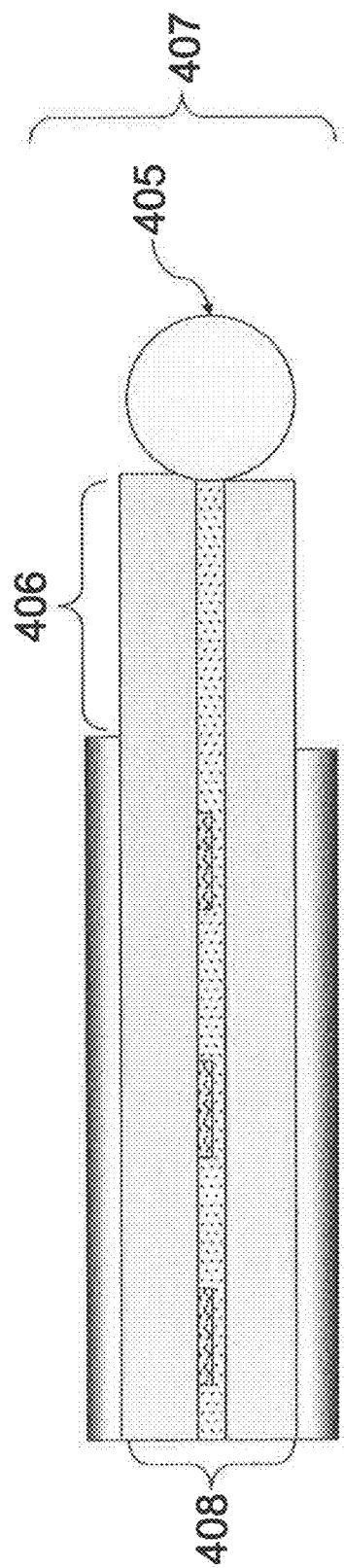

DISPLAY ELEMENT, BACKLIGHT AND PORTABLE INFORMATION DEVICE USING THE DISPLAY ELEMENT

CROSS-REFERENCE TO RELATED APPLICATIONS

This application is based on Japanese Patent Application No. 2014-209533, the contents of which are incorporated herein by reference.

TECHNICAL FIELD

The present invention relates to a display element, and more specifically, relates to a display element capable of electrically switching a light passing direction thereof among the direction of a first face, the direction of a second face, and both. In addition, the present invention also relates to a portable information device including the display element to allow a user to switch the passing direction of light from the display element regardless of the mounting and use states of a display.

BACKGROUND ART

Currently, a liquid crystal element which is the display panel using liquid crystal material has been broadly used for plane display elements. The liquid crystal elements of this type have been used in many areas, and examples of application products of such liquid crystal elements include smartphones, portable game machines, tablets, Notebook type PCs, and TV receivers.

However, a plane display element in practical use has two faces (hereinafter referred to as "front side" and "back side" for explanation purpose). An image is displayed only on the front side, and display operation cannot be performed on the back side (see FIG. 8). FIG. 8 illustrates the case of using a liquid crystal element. In the case of the liquid crystal element, a backlight 802 is provided in the back of a liquid crystal element 801, and a display direction (a light passing direction 804) is only one direction of the both faces so that the liquid crystal element 801 is irradiated with light of the backlight 802 to perform the display operation.

Since the display element emits light only in one direction as described above, application products using such a display element are designed on the condition that light is emitted in one direction. Of products classified as portable information terminals, such as smartphones and tablets, an information terminal (hereinafter referred to as a "slate-type terminal," and see FIG. 2A) configured such that a display element extends across the substantially entirety of one side of the product does not include a keyboard as a character input device in a typical case, and therefore, is not suitable for the purpose including an input operation. There is another design employed typically for transportable Notebook type PCs and allowing an input operation mainly using a keyboard. An information terminal (hereinafter referred to as a "clamshell-type terminal," and see FIG. 2B) having this design is configured so as to be folded with a display and a body facing each other in a normal state and to be used with the display being opened when necessary. In the case of using the design of the clamshell-type terminal, the display has to be opened before use. For this reason, the clamshell-type terminal is not suitable for the purpose of use in any attitudes as in the slate-type terminal, and is intended basically for use in a seated attitude.

As described above, although the slate-type and clamshell-type terminals have both merits and demerits. The products having combined merits of both type terminals have been practically applied. For example, there is a product employing the structure in which a keyboard as an input device is disposed at a cover of a slate-type terminal. However, in the case of using the product with such a structure, a heavier body is unstable in an upright attitude, and there is a probability that troubles such as falling over during use are caused. For these reasons, this product is not suitable for, e.g., the operation on the laps.

On the other hand, when an attempt is made to use the clamshell-type terminal as in use of the slate-type terminal, it is necessary to rotate the display 180 degrees by some kind of means. In order to provide such a configuration, the following structures have been proposed:

1) The structure in which two hinges are provided, which include a hinge for bringing a terminal from a closed state to an open state and a hinge for rotating a display 180 degrees;

2) The structure in which two hinges are provided so as to bring a terminal from a closed state to an open state and to open the terminal to cause a display to rotate to the back side of a body; and 3) The structure in which hinges are provided respectively at ends of a body and a middle portion of a display to rotate the display.

In any of the above-described cases, at least one hinge whose strength is maintained and which includes the complicated mechanism for transmission of electrical signals is additionally provided. Since it is undeniable that an unreasonable configuration is made as compared to a simple clamshell-type portable terminal, there are concerns over lowering of strength and an increase in a failure probability. Moreover, a special hinges with a complicated structure is used, resulting in a cost increase.

These problems are caused because of the following reason. Since the light passing direction of the display element used for the display is only the direction from the front side, the mechanism for rotating the display is essential when a combination terminal of slate-type and clamshell-type terminals are used.

In order to solve these problems, the clamshell-type terminal is used as a basic configuration, and the outputted light is emitted from the display not only from the front side but also from the back side. With this configuration, even in the state in which the display is stacked on the body (a slate state) or the state in which the input device, such as a keyboard, provided at the body is used with the display being opened (a clamshell state), a user can view a display image.

Patent Literature (PTL) 1 has, as the above-described liquid crystal element which can be viewed from any of the front and back sides of the display element, disclosed a both-sided liquid crystal element having the structure in which a backlight is sandwiched between liquid crystal elements.

FIG. 9 illustrates a basic configuration diagram in the case of emitting light not only from the front side but also from the back side. FIG. 9 illustrates a basic structure in the case of using the liquid crystal elements, and the structure is made such that a backlight 902 of emitting light to both sides is disposed in the middle and sandwiched between liquid crystal elements 901a, 901b. With such a structure, the light of the backlight 902 disposed in the middle can transmit through the first liquid crystal element 901a and the second liquid crystal element 901b, and the operation to pass the light to both sides (a light passing direction 904) can be performed with the single backlight shared by the liquid crystal elements 901a, 901b.

An element capable of switching between a light transmission state and a light reflection state has been proposed as another related art. A light control mirror (hereinafter referred to as a "light control element") has been known as such an element capable of electrically switching between the light transmission state and the light reflection state.

A basic structure of this light control element is, e.g., the structure illustrated in FIG. 4 of Non Patent literature (NPL) 1. The principle of the light control element has been found by Professor Griessen et al. of VU University Amsterdam as described in NPL 3 and PTL 2. According to this principle of operation, a metal thin film of rare earth such as yttrium (Y) and lanthanum (La) is bonded to hydrogen, thereby reaching a transparent state. After the hydrogen is removed, the metal thin film is changed into a state (a mirror surface state) with metal luster. In injection and removal of the hydrogen, palladium functions as a catalyst, and therefore, a slightly-thin palladium layer is formed on the surface of the rare-earth metal thin film.

Although the light control element uses hydrogen gas to switch between the transparent state and the mirror surface state, it is necessary to, without using hydrogen in gaseous state, inject hydrogen to the metal layer and remove the hydrogen from the metal layer in order to use the light control element as an electronic device. Moreover, since rare-earth metal has poor efficiency, development has been later made on another metal film.

The structure disclosed in NPL 1 is an example where an all-solid light control element is realized by employing the structure capable of inserting hydrogen atoms into a magnesium-nickel alloy layer and removing the hydrogen atoms from the magnesium-nickel alloy layer without using gas. NPL 1 describes that magnesium-titanium alloy or magnesium-niobium alloy can be used for the metal layer. This light control element requires about several seconds to change the state thereof. However, since such a state changes with a direct current of about 5 [V], the light control element can operate even under the conditions where high voltage cannot be supplied, e.g., in the case of a portable information device. In light reflection direction change which is one of the objectives of the present invention, a state change time of about several seconds does not cause any problems.

The above-described conventional example where the all-solid light control element is applied to the display device includes an example where an all-solid light control element is applied to a semi-transmissive liquid crystal element as described in PTL 3. PTL 3 describes the element configured as a reflective liquid crystal element. Thus, the side of the light control element serving as a mirror in a reflection mode faces an observer. PTL 6 describes, as another example, an example where a light control element is used to switch displaying between displaying in one direction and displaying in both directions. In the structure of PTL 6, configuration is made such that a liquid crystal element is disposed in the middle and that pairs of a light guide plate (a member for guiding light of LEDs provided at end portions to emit light in a planar pattern) and the light control element is arranged with the liquid crystal element being interposed between the pairs of the light guide plate and the light control element. In this configuration, light can be guided in any of both directions of a display element. Moreover, PTL 4 discloses, for the purpose of different application, a device configured to switch, by a light control element disposed as a cover glass of a display element, between a state for information displaying and a state for use as a mirror allowing an observer to view oneself. According to PTL 4, the light control element is disposed on the surface to block displaying, thereby providing the function of the mirror. Further, although not applied to a display device, PTL 5 describes a conventional example where a light control element is, as a screen for projection displaying, used with a scattering reflection-transmission configuration. PTL 5 describes combination of a scattering-transmission type light control element and a reflection-transmission type light control element.

CITATION LIST

Patent Literature

{PTL 1}
  Publication of Japanese Patent No. 4806215
{PTL 2}
  U.S. Pat. No. 5,635,729
{PTL 3}
  Japanese Patent Application Laid-Open Publication No. 2004-279669
{PTL 4}
  Japanese Patent Application Laid-Open Publication No. 2004-258400
{PTL 5}
  Japanese Patent Application Laid-Open Publication No. 2012-173449
{PTL 6}
  Japanese Patent Application Laid-Open Publication No. 2003-35893

Non Patent Literature

{NPL 1}
  Kazuki Yoshimura, "Development of switchable mirror glass with high energy efficiency", Applied Physics, Vol. 79, pp. 628-632, 2010
{NPL 2}
  Kazuki Yoshimura, "Foundation and Application of Smart Window and switchable mirror", Electronic Journal No. 1376, Technical Seminar document, 2012
{NPL 3}
  J. N. Huiberts, et al., "Yttrium and lanthanum hydride films with switchable optical properties", Nature, Vol. 380, pp. 231-234, 1996

SUMMARY OF INVENTION

Technical Problem

A first disadvantage of the related art is possible divulging of information and low energy efficiency. That is, in PTL 1 cited above, the display is obtained with the structure of emitting light in any of the directions from the front side and the back side. However, in the case of using the display with this structure, light is constantly emitted from the display to the front and back sides. For this reason, a third person can view a display image from the other direction from which a user does not view an image, resulting in divulging of information. Even if such a problem is solved in such a manner that displaying by the liquid crystal element on the side on which a user does not wish to display an image is stopped (a black display state) or that, e.g., a physical partition is used not to display an image on the displaying unwanted side, the half of an optical energy directs toward the unutilized side. As a result, the problem of wasting the optical energy is caused.

A second disadvantage of the related art is that even in the case of using the light control element as the measures against the first disadvantage, the passing direction of light from the display cannot be switched between the direction from the front side and the direction from the back side according to observer's utilization scenes to display a high-quality image.

In PTL 3, the side of the light control element serving as the mirror faces the observer in the reflection mode. Since a plurality of light control elements are not applied, the display direction cannot be switched. Light cannot be selectively emitted in any of the directions from the front and the back sides. Moreover, in PTL 3, the semi-transmissive liquid crystal element is used, and therefore, the structure is combined of the light control element and the backlight. However, even if the configuration is made such that another portion including a liquid crystal element is further disposed on the opposite side of the backlight from the portion including the liquid crystal element in PTL 3, the side of the light control element serving as the light reflection surface in the reflection mode faces the observer. Because of the characteristics of the light control element, both faces thereof do not reflect light as a mirror does even in the reflection mode, and the color of blue is shown on the side opposite to the side serving as the mirror surface. Even if a light control layer is transparent, various thin film layers are formed below the light control layer, and therefore, sufficient light reflection cannot be obtained on the side opposite to the side serving as the mirror surface. For this reason, even if the same liquid crystal element is also disposed on the opposite side of the backlight in the above-described structure, sufficient characteristics cannot be obtained.

Further, in the structure of PTL 6, the liquid crystal element is disposed in the middle, and backlights are disposed so as to sandwich the liquid crystal element. For this reason, light diffusion in the light transmission state cannot be taken into consideration, and an image is displayed only with straight light, resulting in the state in which the image is difficult to be viewed. Moreover, in the case of simultaneously displaying an image on the front and back sides, the problem is caused, in which when a correct image is viewed on one of the front and back sides, an image viewed on the other side is a mirror image. In order to obtain a favorable display image, it is necessary for light emitted from the light guide plate to have diffuseness. However, in order to diffuse light emitted from the backlight, it is necessary to apply a diffusive material to the surface of the light guide plate or to provide a scattering sheet on the surface of the light guide plate. In the case of disposing the diffusion sheet in parallel to the panel face of the liquid crystal display element, transmitted light is diffused, resulting in blur light from the back side. If a display image is formed on the back side, viewing of such an image is equivalent to viewing of an image through frosted glass, and therefore, the image is constantly difficult to be viewed. For this reason, this is not practical. Note that the transparent light guide plate may have such a shape that as in a light guide plate shape used for a lighting device (a front light) of a reflective liquid crystal element, light can be projected by a wedge shape formed at alight guide plate surface (such a plate is called a "wedge-shaped light guide plate"). In this case, reflected light is diffused by the scattering reflection function of the reflective liquid crystal element, and therefore, image view-ing can be facilitated. Note that light from the wedge-shaped light guide plate also has low diffuseness. For this reason, even if the wedge-shaped light guide plate is used for the structure, not using the reflective liquid crystal element, of PTL 6, the fact remains that natural transmitted light is not obtained and that an image is difficult to be viewed. Further, in this structure, two relatively-heavy light guide plates are used, and for this reason, there is the problem of this structure being heavier than the structure using two liquid crystal panels.

On the other hand, PTL 4 is intended to provide a mirror function by disposing the light control element on the surface of the display element and blocking displaying. Moreover, PTL 5 describes combination of the scattering-transmission type light control element and the reflection-transmission type light control element. Thus, even with these two techniques, the passing direction of light from the display cannot be switched between the direction from the front side and the direction from the back side according to observer's utilization scenes to display a high-quality image.

In order to solve the above-described problems, the present invention is intended to provide, without lowering a display quality, a liquid crystal display device capable of optionally switching, according to observer's utilization scenes, the passing direction of light from a display among the direction from a front side, the direction from a back side, and in some cases, both directions. Finally, the present invention is intended to provide a portable information device with a simple mechanism, a reduced probability of breakdown, and portability.

Solution to Problem

A display element of one aspect of the present invention includes a planar light emitting body (hereinafter referred to as a "backlight") formed in a planer shape as in a basic structure illustrated in FIG. 1 and capable of emitting light in directions of both faces thereof; two light control elements arranged so as to sandwich the planar light emitting body and capable of externally and electrically switching between a light reflection state and a light transmission state; and two liquid crystal elements arranged on the outside of the light control elements so as to sandwich the planar light emitting body and the light control elements. Each light control element is a display element capable of switching, by voltage applied thereto, a light passing direction between one direction and both directions and as a result, optionally switching a display direction.

With the above-described structure, light emitted in an unwanted direction can be guided to a user side in the following manner. When a user wishes to view a display image from the front side, the light control element disposed on the front side is switched to a transmission mode, and the light control element disposed on the back side is switched to a reflection mode. On the other hand, when the user wishes to view the display image from the back side, the light control element disposed on the front side is switched to the reflection mode, and the light control element disposed on the back side is switched to the transmission mode.

The planar light emitting body used for the display element of one aspect of the present invention includes, at a portion other than the surfaces thereof, dot-shaped cloudy portions or portions with a non-uniform refractive index, and alight source is provided lateral to the planar light emitting body, for example.

Each light control element used for the display element of one aspect of the present invention is configured such that, using the planar light emitting body as a substrate, a reflective light control layer, a catalyst layer, a solid electrolyte layer, an ion storage layer, and a transparent conductive layer are formed in this order from a planar light emitting body side.

With use of the display element of one aspect of the present invention, a portable information device can be provided, which has transportability and which includes a display allowing combination of clamshell-type and slate-type terminals without lowering of display brightness and the concerns on divulging of information due to display operation in an unwanted direction and on falling over due to a heavy display.

Advantageous Effects of Invention

According to the present invention, a display element can be provided, which is capable of displaying an image on each of the front and back sides with a single display element and optionally determining a display direction. A portable information device having transportability and including the display element of the present invention is capable of switching, with a simple configuration, between a slate-type terminal and a clamshell-type terminal. Thus, the weight of the portable information device is reduced, and a complicated hinge(s) is not required. As a result, a cost can be reduced. Moreover, since light is not emitted in an unwanted direction, power consumption can be reduced, and divulging of information can be prevented, for example.

BRIEF DESCRIPTION OF DRAWINGS

FIG. 4A is a first cross-sectional view illustrating the method for forming a backlight using the light control element of the first embodiment of the present invention and the structure of such a backlight.

FIG. 4B is a second cross-sectional view illustrating the method for forming the backlight.

FIG. 4C is a third cross-sectional view illustrating the method for forming the backlight.

DESCRIPTION OF EMBODIMENTS

First Embodiment

Figure 1:
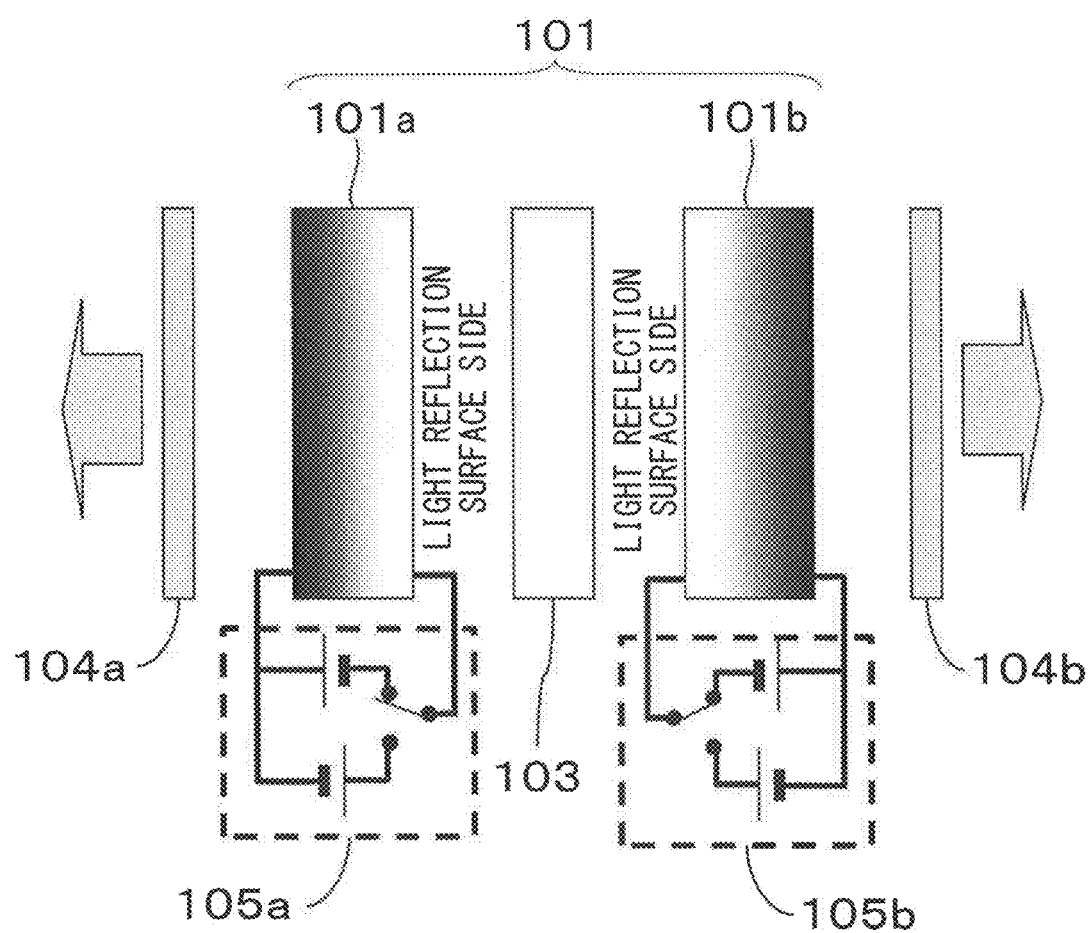
FIG. 1 is a cross-sectional view illustrating a basic structure of a display of a first embodiment of the present invention.

A first embodiment of the present invention has the structure using liquid crystal elements 104a, 104b illustrated in FIG. 1. The description is made below with reference to FIG. 1.

In the present embodiment, the structure is made such that a backlight 103 is disposed in the middle as illustrated in FIG. 1 and that two liquid crystal elements 104a, 104b are arranged so as to sandwich the backlight 103. A first light control element 101a has such a structure that the first light control element 101a is disposed between the backlight 103 and the liquid crystal elements 104a in the state in which the face of the first light control element 101a serving as a light reflection side in a light reflection mode faces the backlight 103. A second light control element 101b has such a structure that the second light control element 101b is disposed between the backlight 103 and the liquid crystal element 104b in the state in which the face of the second light control element 101b serving as a light reflection side in a light reflection mode faces the backlight 103. Hereinafter, the first light control element 101a and the second light control element 101b are sometimes abbreviated as light control elements 101.

The light control elements 101 are capable of switching between alight transmission mode and the light reflection mode by applying the voltage. The voltage to be applied is DC voltage, and it allows switching between the light transmission mode and the light reflection mode by polarity reversion. Such a switch mechanism includes voltage controllers 105a, 105b. When the positive voltage is applied to the light reflection surface side, a light control mirror is switched to the light reflection mode. On the other hand, when the negative voltage is applied to the light reflection surface side, the light control mirror is switched to the light transmission mode. In any of the cases of the positive and the negative voltages, the voltage to be applied at this point is about 1 [V] (the voltage may be turned off after the completion of reaction).

In the case of FIG. 1, the negative voltage from the voltage controller 105a is applied to the light reflection surface side of the first light control element 101a and the negative voltage from the voltage controller 105b is applied to the light reflection surface side of the second light control element 101b. Therefore, the first light control element 101a is in the light transmission mode and the second light control element 101b is in the light transmission mode. Thus, the state is brought about, in which light from the backlight 103 transmits through the first and second light control elements 101a and 101b, and then, the light is emitted to the outside from the liquid crystal elements 104a, 104b. Thus, in this state, a display image can be viewed from both sides.

When a switch of either one of the voltage controllers 105a, 105b is switched to change the direction of voltage to be applied, e.g., when voltage to be applied from the voltage controller 105a to the light reflection surface side is changed to a positive side, the first light control element 101a connected to the voltage controller 105a is changed to the light reflection mode. Thus, light from the backlight 103 does not reach the liquid crystal element 104a, and therefore, a display image cannot be viewed on the side close to the liquid crystal element 104*a*. When voltage to be applied from the voltage controller 105*b* to the light reflection surface side is changed to a positive side, the second light control element 101*b* connected to the voltage controller 105*b* is changed to the light reflection mode. Thus, light from the backlight 103 does not reach the liquid crystal element 104*b*, and therefore, a display image cannot be viewed on the side close to the liquid crystal element 104*b*. This allows switching between the state in which a display image can be viewed on both sides and the state in which light can be perceived only on one side.

In the configuration of the present embodiment, the operation being subject to the present invention is, in order to confirm the above-described state, confirmed in such a manner that the first light control element 101*a* formed on glass is inserted between the backlight 103 and the liquid crystal element 104*a*, and the second light control element 101*b* formed on glass is inserted between the backlight 103 and the liquid crystal element 104*b*.

Figure 3:
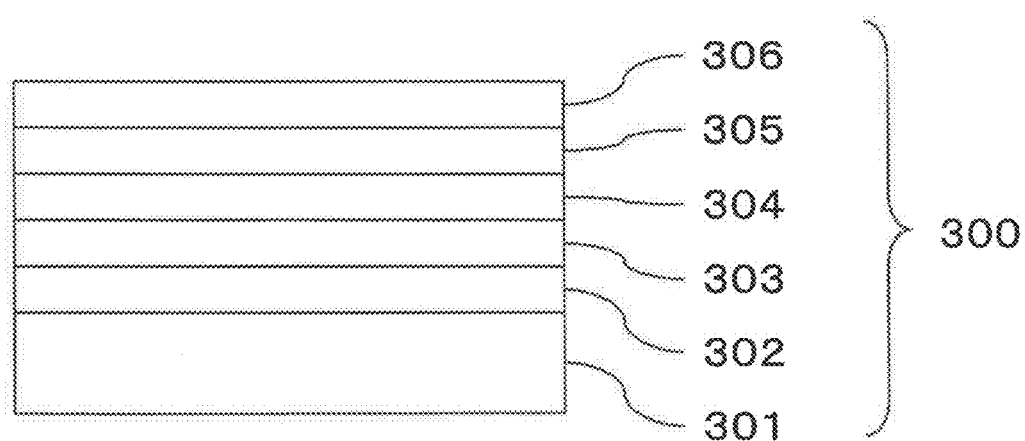
FIG. 3 is a cross-sectional view illustrating a layer structure of a light control element of the first embodiment of the present invention.

FIG. 3 is a view specifically illustrating the structure of the first light control element 101*a* and the second light control element 101*b*. Each of the first light control element 101*a* and the second light control element 101*b* is formed at the following steps. A glass substrate 301 is used as a base substrate. ITO as a transparent conductive film 302 is, by sputtering method, vapor-deposited to 100 [nm] on the glass substrate 301. Then, a WO3 layer is formed in such a manner that sputtering is, using tungsten as a target, performed by introducing oxygen into atmosphere, and then, is vapor-deposited to 1000 [nm] as an ion storage layer 303. Subsequently, hydrogen introduction is performed using sulfuric acid, thereby forming an H:WO3 layer. Then, a solid electrolyte layer 304 is formed to 400 [nm] on the H:WO3 layer by oxygen introduction reactive sputtering using a Ta target. After palladium (Pd) as a catalyst layer 305 is vapor-deposited to 4 [nm] on the solid electrolyte layer 304, vapor-deposition is performed using magnesium and nickel as a target. As a result, a reflective light control layer 306 is formed. The following target is used as an alloy of magnesium and nickel used as the target in the above-described process: an alloy of magnesium and nickel which can be formed by arranging finely-divided target blocks or strip-shaped targets each formed at a magnesium-nickel area ratio of 1:2 and performing a single vapor-deposition step.

A light control element 300 formed as described above is provided as the first light control element 101*a* and as the second light control element 101*b* illustrated in FIG. 1 such that the reflective light control layer 306 is disposed facing the backlight 103.

In the present embodiment, use of the light control elements allows switching of the light passing direction between the direction away from the front side and the direction away from the back side. However, the light control elements typically cannot perform high-speed switching as in the liquid crystal elements, and requires a certain amount of time (about several seconds) for switching.

For this reason, while the light passing direction is being switched, the light might be emitted in both directions in some situations. Due to the unexpected light leakage, the shock might be given to an observer. In order to avoid such a situation, it is desired to control not to emit the light in any directions during switching period of the light passing direction.

An example of a sequence of switching of the light control elements considering the above-described concerns will be described below:

1) switching of the display direction begins;
2) a black display state of both of two liquid crystal elements 104*a*, 104*b* arranged so as to sandwich the backlight 103 is brought about;
3) changing of the states of the light control elements 101 begins (the voltage of the voltage controller 105*a* or 105*b* disposed on the side from which it is desired to emit light is switched. For example, in order to display an image on the liquid crystal element 104*a*, the light reflection surface side of the first light control element 101*a* connected to the voltage controller 105*a* is switched to the negative side. On the other hand, the light reflection surface side of the second light control element 101*b* connected to the voltage controller 105*b* is switched to the positive side.);
4) changing of the states of the light control elements 101 is completed;
5) the display operation on the liquid crystal element 104*a* on the side on which the first light control element 101*a* is in the light transmission state, or the display operation on the liquid crystal element 104*b* on the side on which the second light control element 101*b* is in the light transmission state, begins (in the example of 3), the display operation on the liquid crystal element 104*a* begins);
6) the display operation on the liquid crystal element 104*a*, 104*b* on the side on which the light control element 101*a*, 101*b* is in the light reflection state is stopped (in the example of 3), the display operation on the liquid crystal element 104*b* is stopped. Power consumption increases to some extent, but such an increase in power consumption does not cause any problems when the liquid crystal element 104*b* remains in the black display state.); and
7) the sequence is completed.

Moreover, the backlight may be turned off as follows in switching:

1) switching of the display direction begins;
2) light emission of the backlight 103 is stopped, and the display operation on either one, which is on a desired display side, of the liquid crystal elements 104*a*, 104*b* or both of the liquid crystal elements 104*a*, 104*b* begins;
3) changing of the states of the light control elements 101 begins (the voltage of the voltage controller 105*a* or 105*b* disposed on the side from which it is desired to emit light is switched. For example, in order to display an image on the liquid crystal element 104*a*, the light reflection surface side of the first light control element 101*a* connected to the voltage controller 105*a* is switched to the negative side. On the other hand, the light reflection surface side of the second light control element 101*b* connected to the voltage controller 105*b* is switched to the positive side.);
4) changing of the states of the light control elements 101 is completed;
5) light emission of the backlight 103 begins; and
6) the sequence is completed.

The above-described sequence has been set forth as an example, and it is essential not to emit light from the display toward an observer while the states of the light control elements 101 being changed. In some cases, while the states of the backlight 103 and the liquid crystal elements 104*a*, 104*b* are maintained, one of the first and the second light control elements 101*a* and 101*b* in the light transmission state may be shifted to the light reflection state, and then, the other light control element may be switched to the light transmission state, for example. Alternatively, there may be a utilization method producing designability and an advertisement effect by actively using a time while the states of the light control elements 101 are being changed, such as displaying of a particular pattern on the display during state changing.

Second Embodiment

In the present embodiment, the light control elements 101 and the backlight 103 mounted as separate components in the first embodiment are integrated together to realize thickness reduction.

In this configuration, if the light control elements 101 are simply formed on the backlight 103, there is no guiding mechanism guiding the light toward the outside, so the light will pass through the light guide plate forming the backlight 103 due to total reflection, and for this reason, the backlight 103 cannot be used as a normal backlight. In the present embodiment, a backlight 407 is formed by the method illustrated in FIG. 4.

A view illustrating the method for producing the backlight 407 employed in the present embodiment is shown in FIGS. 4A, 4B, and 4C. The method in FIGS. 4A to 4C for forming light control elements 401 are different from that of the first embodiment in that not glass but an acrylic material is used for a substrate and that the process order of forming films as illustrated in FIG. 3 is reversed in light control element portion formation. That is, a reflective light control layer, a catalyst layer, a solid electrolyte layer, an ion storage layer, and a transparent conductive layer are formed in this order on an acrylic substrate 403. The manufacturing method for forming each film is similar to that of the first embodiment. Moreover, in the present embodiment, the face of the acrylic substrate 403 forming a light control element portion is flat without recesses and projections. With reference to FIG. 4A, two light control elements 401 are formed respectively on the acrylic substrates 403 by the described manufacturing method. Then, white ink 402 is, by printing, applied in a predetermined shape onto the face of one of the acrylic substrates 403 opposite to the face on which the light control element 401 is formed. Subsequently, with reference to FIG. 4B, the substrate with the white ink 402 and the substrate without the white ink 402 are stacked on each other such that the light control element portions face outward. With reference to FIG. 4B, a clearance between the substrates is filled with an adhesive 404. At this point, a thermoset adhesive 404 curable at relatively low temperature is used. A similar effect can be obtained in such a manner that an ultraviolet curable adhesive is used to bring the light control elements into the light transmission state and is irradiated with ultraviolet light. Moreover, the similar effect can be also obtained not by bonding with the adhesive but by bonding with a gluing agent (an adhesive sheet) typified by an OCA sheet manufactured by 3M Company.

The backlight 407 formed as described above has such a structure that the light control elements 401 sandwich a light guide plate portion 408 formed by bonding the substrates together. In the case where the light control elements 401 have mirror surfaces, the light emitted from a light source 405 propagates forward while being totally reflected in the light guide plate portion 408. When the white ink 402 is on the propagation path, total reflection conditions become unsatisfied due to the light diffusion, and then, the light is emitted to the outside through the substrate surfaces. In the present embodiment, even light which is out of the total reflection conditions in a normal situation is reflected by the light control elements 401. For this reason, a trouble that light intensity in the vicinity of the light source is high is confirmed. Thus, in the present embodiment, it is important for the light uniformity of a backlight to place the light control elements 401 apart from the light source with a certain distance (5 mm in the present embodiment, but a longer distance is preferable because a longer distance results in more quenching of light which is out of the total reflection conditions) as illustrated in FIG. 4C. Since a similar state is also caused at end portions, it is also preferable not to form the light control elements 401 in the vicinity of the end portions (e.g., the structure as in a non-mounted portion 406 is preferable. Without the non-mounted portion 406, no problem is caused in the operation of the backlight).

The backlight 407 formed as described above and including the light control element layers on the faces thereof is used instead of the backlight 103, thereby forming the display with the configuration illustrated in FIG. 1 (at this point, a diffusion sheet, a light collection sheet, etc. are, as in a typical liquid crystal element, arranged between the backlight and the liquid crystal element, but are not shown in the figure because these components are not essential in the present invention). The following result is confirmed: the states of the light control elements on the front and back sides are controlled to cause the liquid crystal element on a light emission side to be in an active state and to cause the liquid crystal element on the opposite side to be in a light blocked state, and as a result, the display operation can be efficiently performed. Moreover, it is also confirmed that the configuration of one of the liquid crystal elements is inverted from that of the other liquid crystal element so that a similar display image can be formed on both sides.

Figure 5:
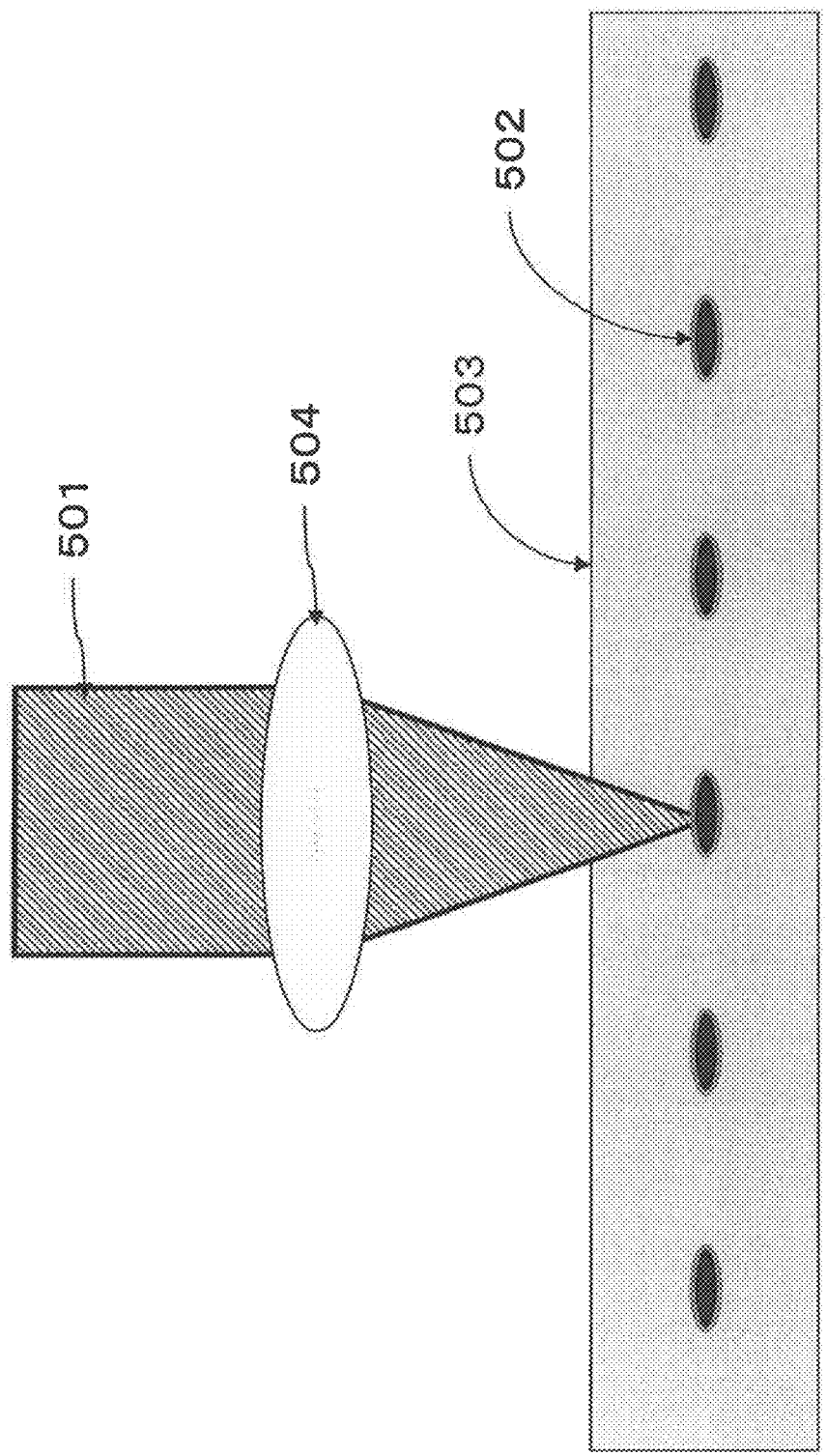
FIG. 5 is a view illustrating the method for forming, using a laser, cloudy portions in a light guide plate using the light control element of the first embodiment of the present invention.

In the above-described configuration, the white ink is printed on the middle portion of one of the light guide plates, and then, the light guide plates are bonded together. In this manner, the total reflection conditions for light totally reflected in the light guide plate portion 408 become unsatisfied, and as a result, light emission to the outside can be realized. The cloudy portion formation method by laser spotting for using, e.g., a laser to form, from the outside, the cloudy portions at a middle portion of an acrylic plate used as a light guide plate is illustrated in FIG. 5. In this case, the bulk portions of a transparent light guide body 503 made of acrylic are irradiated from the outside with a laser beam 501 condensed through a condenser lens 504, and as a result, the cloudy portions 502 are formed at the bulk portions of the transparent light guide body 503. Even if this transparent light guide body 503 formed as described above is used instead of the light guide body portion illustrated in FIG. 4, there is no difference in operation.

In the present embodiment, the example of using the acrylic plate as the material forming the light guide body portion has been described. However, the advantageous effects of the present invention are not limited to the acrylic plate, and any plate-shaped transparent materials are applicable regardless of inorganic or organic materials.

Figure 6:
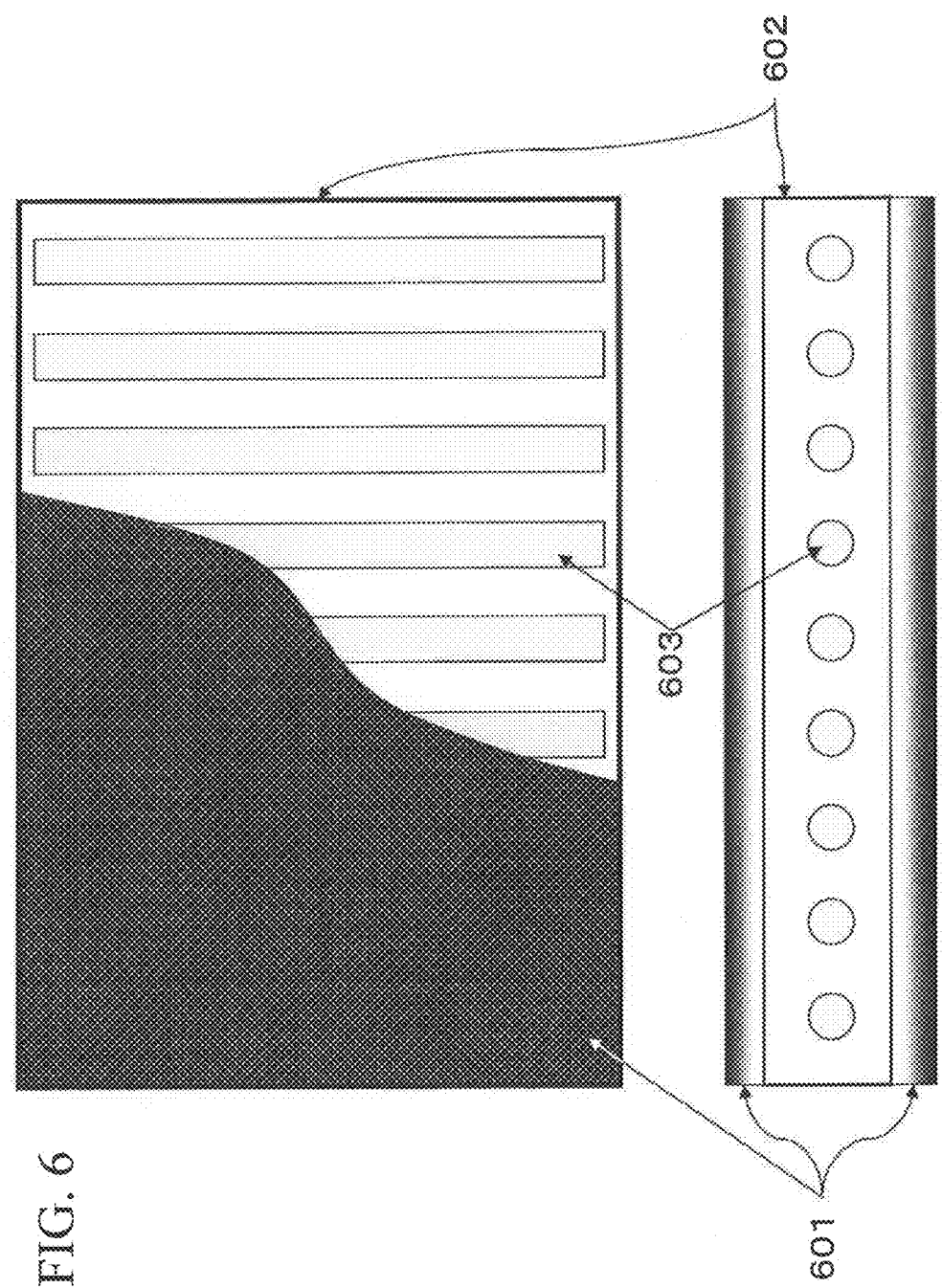
FIG. 6 is a view illustrating the case where a direct backlight is applied as a light source in the structure of the backlight using the light control element of the first embodiment of the present invention.
Figure 7:
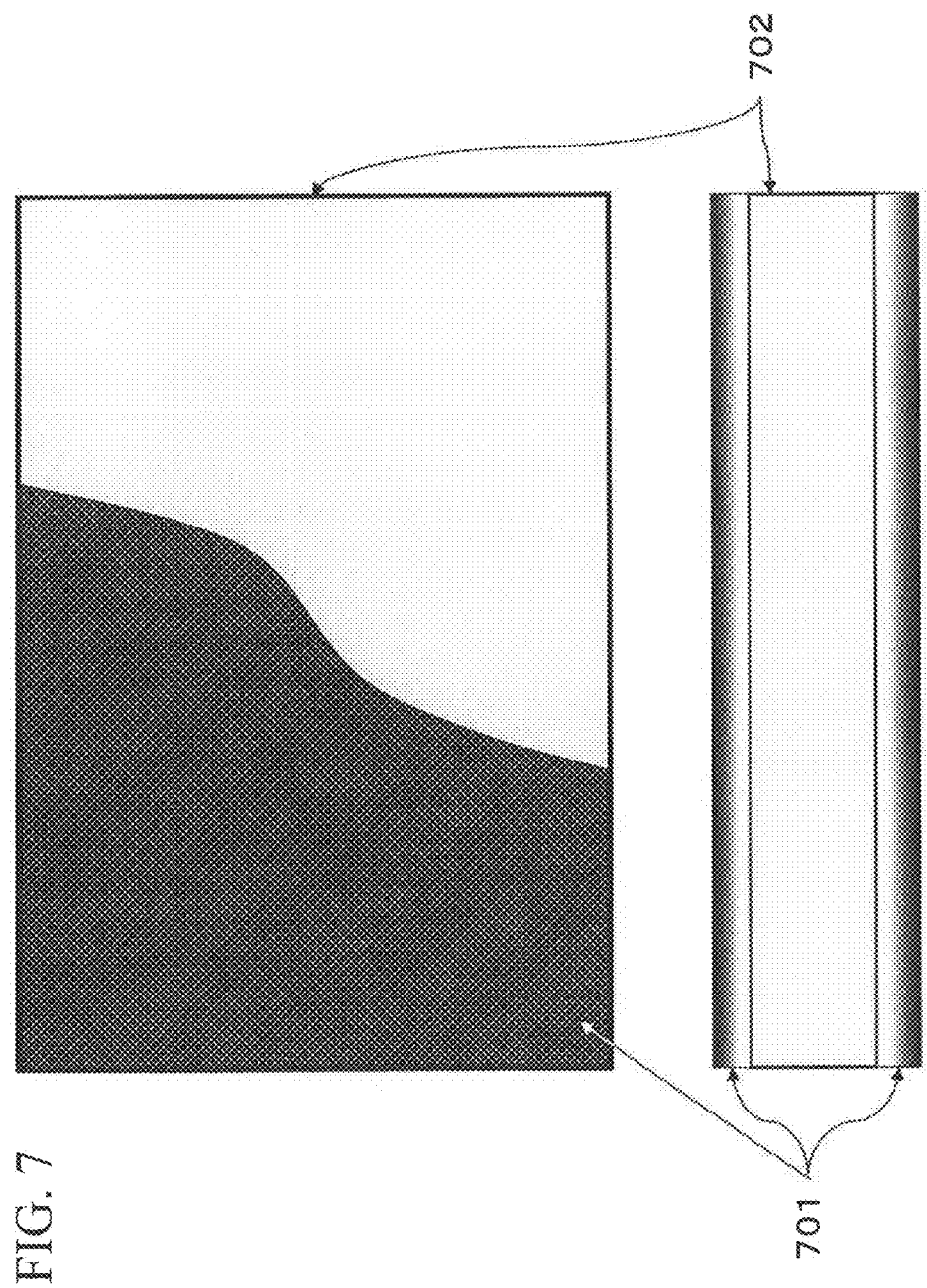
FIG. 7 is a view illustrating the case where a surface emission type backlight is applied as the light source in the structure of the backlight using the light control element of the first embodiment of the present invention.
Figure 8:
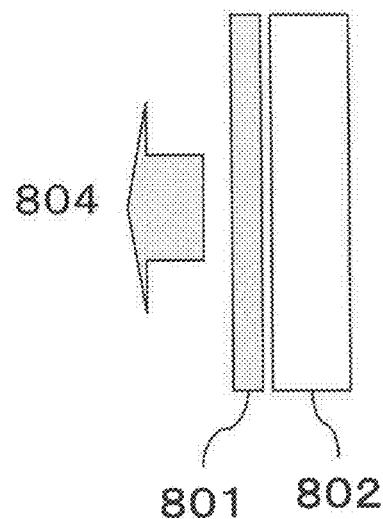
FIG. 8 is a cross-sectional view illustrating the structure of a conventional planar display element.
Figure 9:
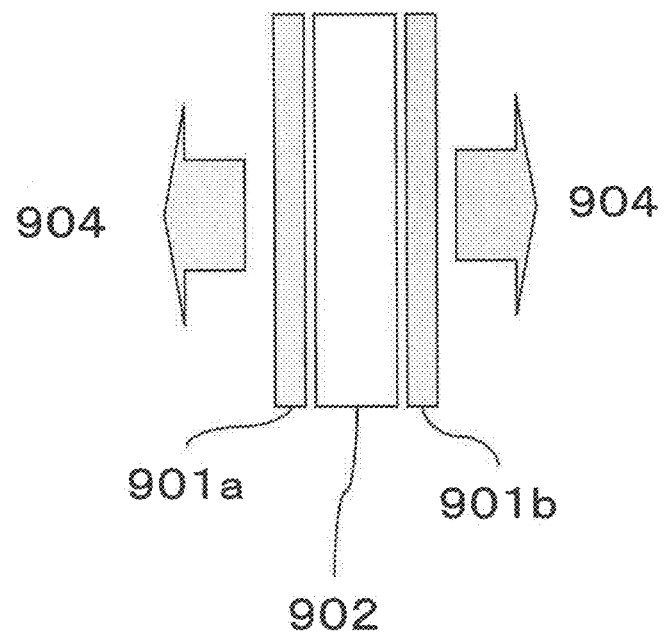
FIG. 9 is a cross-sectional view illustrating propagation of light in a conventional example.

In the structure of FIG. 4A, a so-called side light type structure has been described, in which the light source is disposed lateral to the light guide plates and the planar light source is configured in such a manner that light emitted from the light source is multiply-reflected in the light guide plates to cause part of the light to be emitted to the outside. However, not only the structure of FIG. 4C but also a direct light source capable of operating as a planar light source by the light sources 603 arranged in a light source housing 602 as illustrated in FIG. 6 may be used as the light source. In this case, the light control elements 601 are arranged so as to sandwich the light source housing 602 in the state in which the faces of the light control elements serving as light reflection surfaces in a reflection mode face the light source housing 602.

Alternatively, a light source configured to emit light in a planar pattern by itself, such as an electro-luminescent (EL) element, may be used as the light source. In use of this light source, a planar light emitting element 702 (e.g., an EL element) may be disposed in the middle, and may be disposed between light control elements 701 such that the faces of the light control elements 701 serving as light reflection surfaces in a reflection mode face the planar light emitting element 702.

In the above-described structures, a sheet group of a diffusion sheet, a light collection sheet, etc. is, as in a typical liquid crystal element, disposed between the portion forming the planar light source portion and the portion forming the liquid crystal element portion, but is not shown in the figure because these components are not essential in the present invention. Moreover, not only this sheet group is, needless to say, disposed between the light control elements 401, 601, 701 and the liquid crystal element, but also may be disposed between the light control elements 401, 601, 701 and the light source housing 602.

When a normally black mode (typified by an In Plane Switching (IPS) mode or a Virtical Alignment (VA) mode) is used for the liquid crystal element used in the present embodiment, the liquid crystal element is in the light blocked state without voltage application. Thus, the light leakage is reduced. In the case where the polarization directions of polarizers provided respectively on the backlight sides of liquid crystal elements are perpendicular to each other to allow image viewing on both sides, strong light, such as direct sunlight, irradiated to the liquid crystal element from the outside is prevented from exiting through the opposite surface. Thus, lowering of an image quality is reduced.

Third Embodiment

A third embodiment of the present invention will be described with reference to FIG. 2B.

Figure 2A:
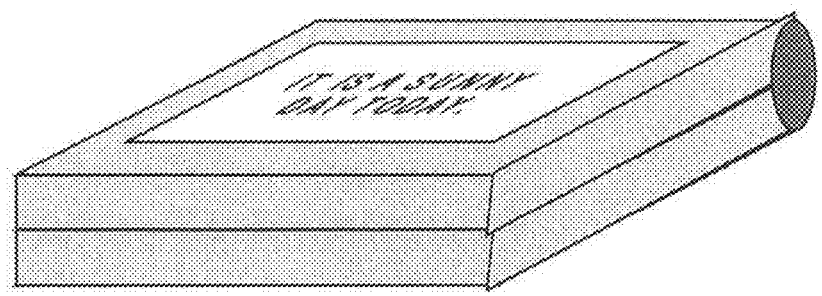
FIG. 2A is a perspective view illustrating a slate structure of a portable information terminal having transportability and including the display of the first embodiment of the present invention.
Figure 2B:
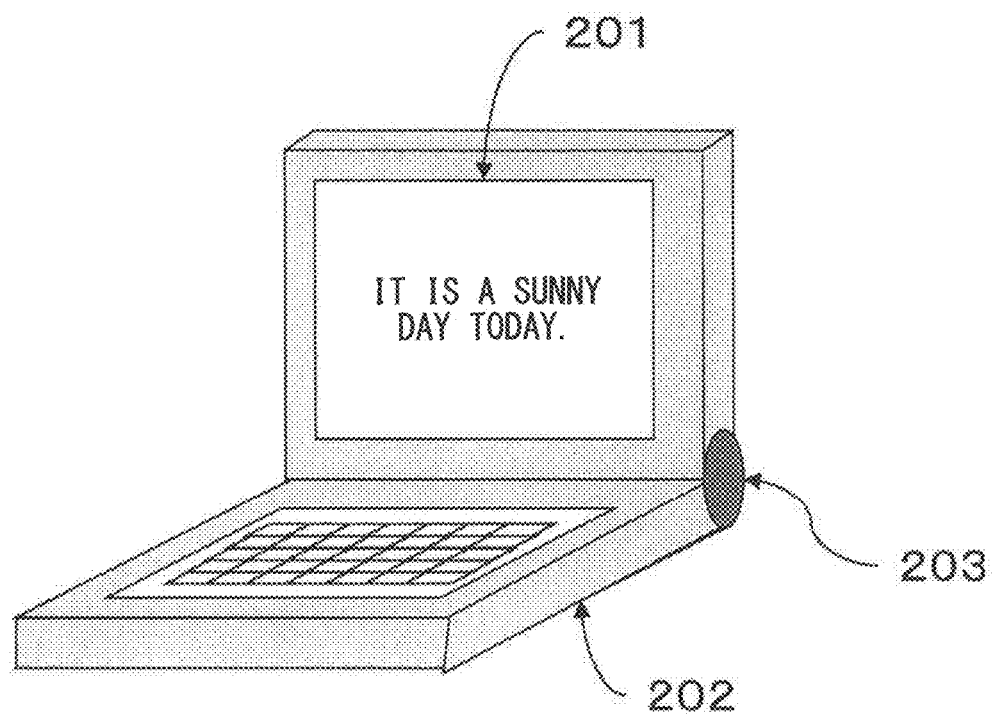
FIG. 2B is a perspective view illustrating a clamshell structure of a portable information terminal having transportability and including the display of the first embodiment of the present invention.

FIG. 2B is a view illustrating the configuration of a transportable information terminal including the display formed in the first or second embodiment. The transportable information terminal of the present embodiment is configured such that a display 201 and a body 202 are provided and are connected together with a hinge 203 (the display and the body may be separated from each other, and may be wirelessly connected together).

In the transportable information terminal of FIG. 2 including the display of the present invention, large battery, power source device, and keyboard and other heavy main components can be mounted on the body 202. Moreover, since the display 201 can be substantially formed only of a display element and a member for ensuring strength, the weight of the display 201 can be reduced. Further, the display of the present invention is capable of selectively display an image on the front and the back sides. Thus, when the display and the body are stacked on each other, displaying on the back side is activated to operate the transportable information terminal as a slate-type terminal. In this case, instructions are substantially input only by screen touching. However, mainly considering information storage, the terminal of this type is sufficiently valuable in use.

In the case where the display 201 is used after the display 201 and the body 202 are opened from each other, displaying on the front side is activated. A switch used for switching at this point is placed at the hinge connecting the display 201 and the body 202 together, and the sequence for display switching as described in the first embodiment begins at the event of opening the display 201. On the other hand, an operator's instruction is necessary for the state in which light is emitted in directions. For this reason, software or a separately-provided switch (regardless of a hard switch or a soft switch) is operated to begin the sequence of display switching as described in the first embodiment. In this manner, display switching is performed. With the switching mechanism described above, the display 201 and the body 202 can be opened from each other to use an input device, such as a keyboard or a mouse pad, provided at the body 202. Thus, there is an advantage that high-speed input is allowed. Moreover, since the heavy components are stored in the body 202, the center of gravity is positioned lower. Thus, there are many advantages including, e.g., avoidance of risk such as falling over.

In the embodiments of the present invention, no active elements (three-terminal elements, two-terminal elements) such as thin film transistors (TFTs) have been shown for illustration in the figures. The advantageous effects of the present invention do not relate to whether the display element is an active type or a passive type, and the presence or absence of the active element is not essential. For this reason, no active elements are shown in the figure. Needless to say, the advantageous effects of the present invention are not lowered regardless of whether the method for driving the liquid crystal element is active driving or passive driving.

INDUSTRIAL APPLICABILITY

Utilization examples of the present invention include liquid crystal display devices used for laptop PCs, tablet terminals, smartphone terminals, portable phones, digital cameras, liquid crystal televisions, etc.

REFERENCE SIGNS LIST 101 light control elements
101a first light control element
101b second light control element
103 backlight (planar light emitting body)
104a liquid crystal element
104b liquid crystal element
105a voltage controller
105b voltage controller
201 display
202 body
203 hinge
300 light control element
301 glass substrate
302 transparent conductive film
303 ion storage layer
304 solid electrolyte layer
305 catalyst layer
306 reflective light control layer
401 light control element
402 white ink
403 acrylic substrate
404 adhesive
405 light source
406 non-mounted portion
407 backlight
408 light guide plate portion
501 laser beam
502 cloudy portion 503 transparent light guide body
504 condenser lens
601 light control element
602 light source housing
603 light source
701 light control element
702 EL light emitting portion
801 liquid crystal element
802 backlight
804 light passing direction
901a, 901b liquid crystal element
902 backlight
904 light passing direction

The invention claimed is:

1. A display element comprising:
a planar light emitting body formed in a planar shape and capable of emitting light in directions of both faces thereof;
two light control elements arranged so as to sandwich the planar light emitting body and capable of externally and electrically switching between a light reflection state and a light transmission state; and
two liquid crystal elements arranged on an outside of the light control elements so as to sandwich the planar light emitting body and the light control elements,
wherein each light control element has a function of switching, by voltage applied thereto, a light passing direction between one direction and both directions to optionally switch a display direction,
wherein the planar light emitting body has a structure in which first and second planar transparent bodies are bonded together,
wherein the first planar transparent body includes a white ink portion on one of faces of the first planar transparent body, and includes one of the light control elements on the other face of the first planar transparent body,
wherein the second planar transparent body includes the other light control element on one of faces of the second planar transparent body, and
wherein the first and second planar transparent bodies are bonded together with an adhesive or a gluing agent such that the faces thereof on which the light control elements are provided face outward.

2. A display element comprising:
a planar light emitting body formed in a planar shape and capable of emitting light in directions of both faces thereof;
two light control elements arranged so as to sandwich the planar light emitting body and capable of externally and electrically switching between a light reflection state and a light transmission state; and
two liquid crystal elements arranged on an outside of the light control elements so as to sandwich the planar light emitting body and the light control elements,
wherein each light control element has a function of switching, by voltage applied thereto, a light passing direction between one direction and both directions to optionally switch a display direction, and
wherein each light control element is configured such that a reflective light control layer, a catalyst layer, a solid electrolyte layer, an ion storage layer, and a transparent conductive layer are formed in this order from a planar light emitting body side.

3. The display element according to claim 2, wherein the planar light emitting body includes, at a portion other than surfaces thereof, a dot-shaped cloudy portion, and a light source is provided lateral to the planar light emitting body.

4. The display element according to claim 1, wherein a liquid crystal mode of normally black is used for the liquid crystal elements.

5. A portable information device comprising:
a display including the display element according to claim 1; and
a body including an input device, wherein,
when the display and the body are stacked on each other, light is controlled so as to be emitted in an outward direction of the display, and
when the display and the body are opened from each other, control is performed such that an image can be displayed in an inward direction of the display.

6. The display element according to claim 2, wherein a liquid crystal mode of normally black is used for the liquid crystal elements.

7. A portable information device comprising:
a display including the display element according to claim 2; and
a body including an input device, wherein,
when the display and the body are stacked on each other, light is controlled so as to be emitted in an outward direction of the display, and
when the display and the body are opened from each other, control is performed such that an image can be displayed in an inward direction of the display.

* * * * *